J. E. ATWOOD.
Car-Wheels.

No. 144,495.    Patented Nov. 11, 1873.

UNITED STATES PATENT OFFICE.

JAMES E. ATWOOD, OF PITTSBURG, PENNSYLVANIA.

IMPROVEMENT IN CAR-WHEELS.

Specification forming part of Letters Patent No. 144,495, dated November 11, 1873; application filed June 12, 1873.

*To all whom it may concern:*

Be it known that I, JAMES E. ATWOOD, of Pittsburg, in the county of Allegheny and State of Pennsylvania, have invented certain new and useful Improvements in Car-Wheels, of which the following is a specification:

The object of this invention is certain improvements in that class of car-wheels composed of two or more sections, the principal features of which are durability and cheapness of construction.

To this end my invention consists in casting the hub and outer rim or tire in two separate pieces, and connecting the two together by placing on the periphery of the hub a wrought-iron band or hoop of a little greater width than the hub portion, and then place thereon the outer rim or tire. After this has been done I rivet or braze down the wrought-iron band flush, or nearly so, with the surface of the wheel, which has the effect of producing a tight and practical joint between the hub and tire.

Figure 1:
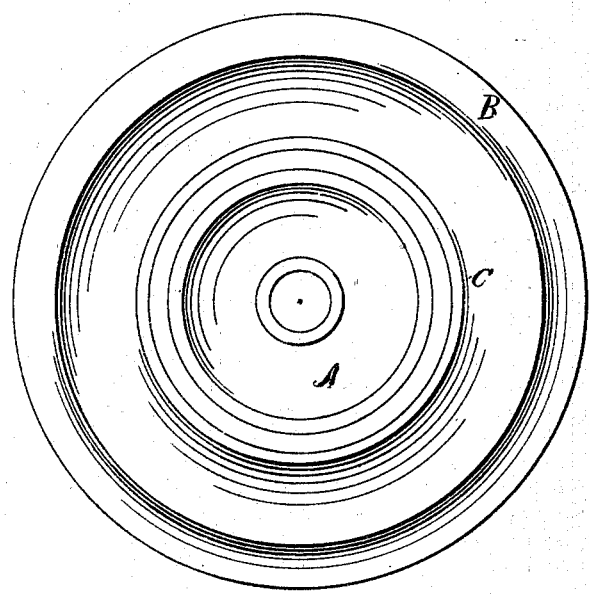
Figure 2:
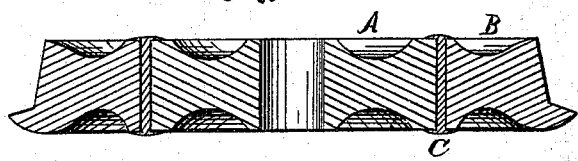

In the drawings, Figure 1 is a side view of a car-wheel made according to my invention; Fig. 2, a section thereof.

The hub A and outer rim or tire B are made of cast-iron or steel. When both portions are made of cast-iron I place around the periphery of the hub a wrought-iron band, C, and then place the tire B upon the same, after which the wrought-iron band C is riveted or brazed down upon the sides of the hub and tire, which has the effect of strongly and securely uniting the two together. The band C is made of a width somewhat greater than the width of the hub and outer rim or tire, so as to have projecting edges for the purpose of turning or riveting down, as before mentioned.

It will be seen, from this construction of car-wheels, that if the tire or outer rim B becomes worn or accidentally injured in any manner, it can be easily removed and replaced by a new one, enabling the hub A to be used many times, as it is very rarely injured and much less liable to breakage than the tire.

Having thus fully described my invention, what I claim as new, and desire to secure by Letters Patent, is—

A car-wheel composed of two sections, A and B, the sections united by means of an interposed iron band, C, the projecting edges being riveted down, substantially as shown and described.

In testimony that I claim the foregoing I have hereunto set my hand this 31st day of May, 1873.

JAMES E. ATWOOD.

Witnesses:
    GEO. DAY,
    JAMES M. DAY.